(12) United States Patent
Verma et al.

(10) Patent No.: US 10,990,517 B1
(45) Date of Patent: Apr. 27, 2021

(54) CONFIGURABLE OVERLAY ON WIDE MEMORY CHANNELS FOR EFFICIENT MEMORY ACCESS

(71) Applicant: Xilinx, Inc., San Jose, CA (US)

(72) Inventors: Hare K. Verma, San Jose, CA (US); Jiayou Wang, San Jose, CA (US); Vincent Mirian, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/259,895

(22) Filed: Jan. 28, 2019

(51) Int. Cl.
  *G06F 12/02* (2006.01)
(52) U.S. Cl.
  CPC .................. *G06F 12/0238* (2013.01)
(58) Field of Classification Search
  None
  See application file for complete search history.

(56) References Cited

U.S. PATENT DOCUMENTS

| | | | | |
|---|---|---|---|---|
| 6,625,685 B1* | 9/2003 | Cho | ............ | G06F 12/0607 711/105 |
| 7,089,379 B1* | 8/2006 | Sharma | ............ | G06F 12/0607 365/230.03 |
| 2003/0070055 A1* | 4/2003 | Johnson | ............ | G06F 13/1642 711/202 |
| 2004/0205305 A1* | 10/2004 | Lee | ............ | G11C 7/1075 711/149 |
| 2008/0320255 A1* | 12/2008 | Wingard | ............ | G06F 15/17375 711/157 |
| 2009/0204872 A1* | 8/2009 | Yu | ............ | G06F 12/0246 714/773 |
| 2012/0159037 A1* | 6/2012 | Kwon | ............ | G06F 13/364 710/317 |
| 2014/0310503 A1* | 10/2014 | Avoinne | ............ | G06F 12/0607 711/211 |
| 2015/0095595 A1* | 4/2015 | Wang | ............ | G06F 12/0607 711/157 |
| 2015/0100746 A1* | 4/2015 | Rychlik | ............ | G06F 12/0607 711/157 |
| 2019/0042408 A1* | 2/2019 | Schmisseur | ............ | G06F 3/0673 |
| 2019/0042409 A1* | 2/2019 | Jereczek | ............ | G06F 13/1647 |
| 2019/0220404 A1* | 7/2019 | Hwang | ............ | G06F 12/0253 |

\* cited by examiner

*Primary Examiner* — Charles Rones
*Assistant Examiner* — Ralph A Verderamo, III
(74) *Attorney, Agent, or Firm* — Patterson + Sheridan, LLP

(57) ABSTRACT

Examples described herein relate to efficient memory access. An example is a system includes a programmable device, and a memory. The programmable device is coupled to the host and receives the read/write requests and the addresses associated therewith. The programmable device interleaves the read/write requests across multiple communication channels based on a subset of bits within each address. The memory receives the read/write requests from the programmable device. The memory stores contents associated with the addresses for write requests and returns contents associated with the addresses for a read request to the programmable device. The programmable device returns the received contents to the host for processing.

20 Claims, 12 Drawing Sheets

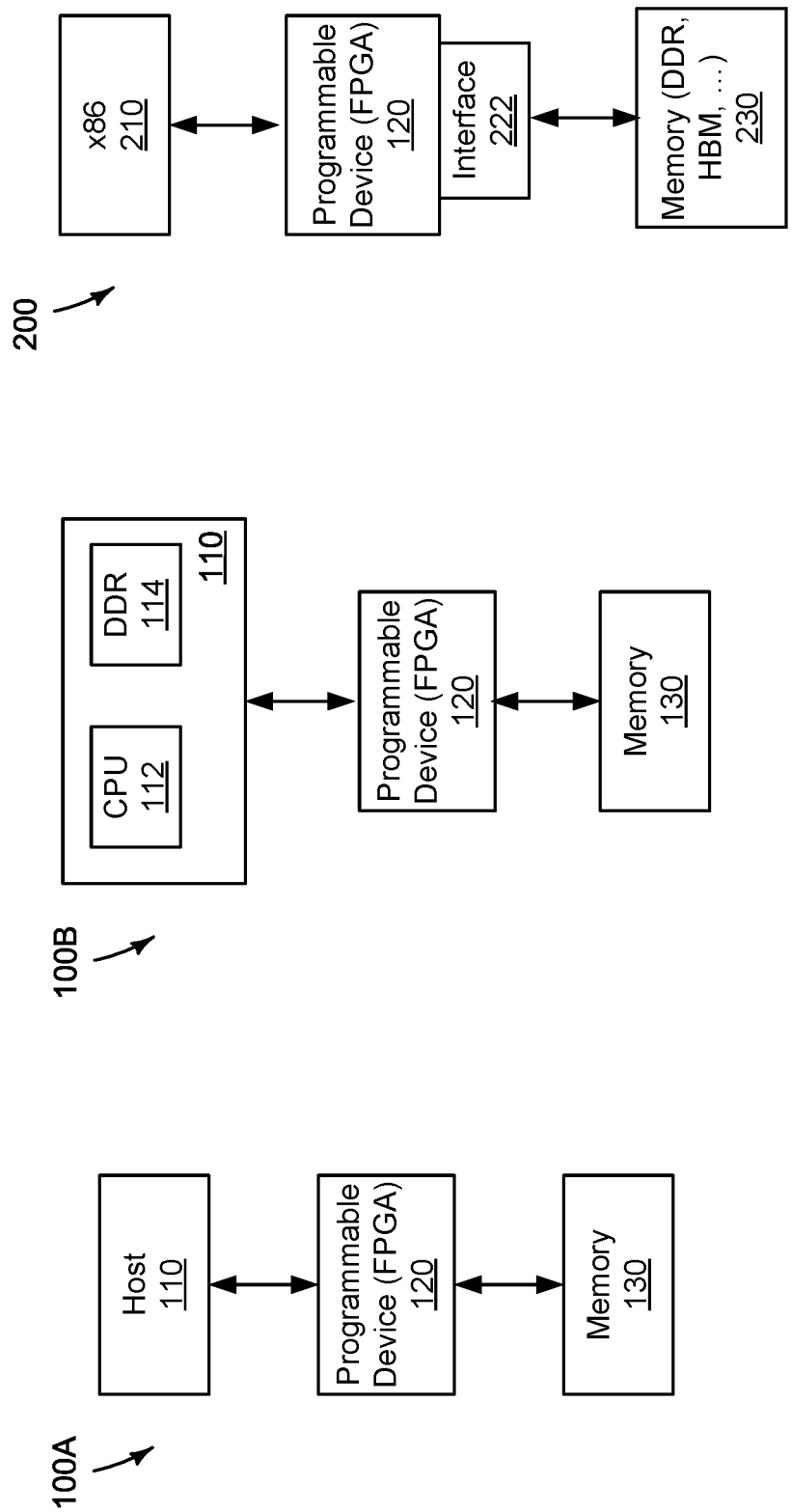

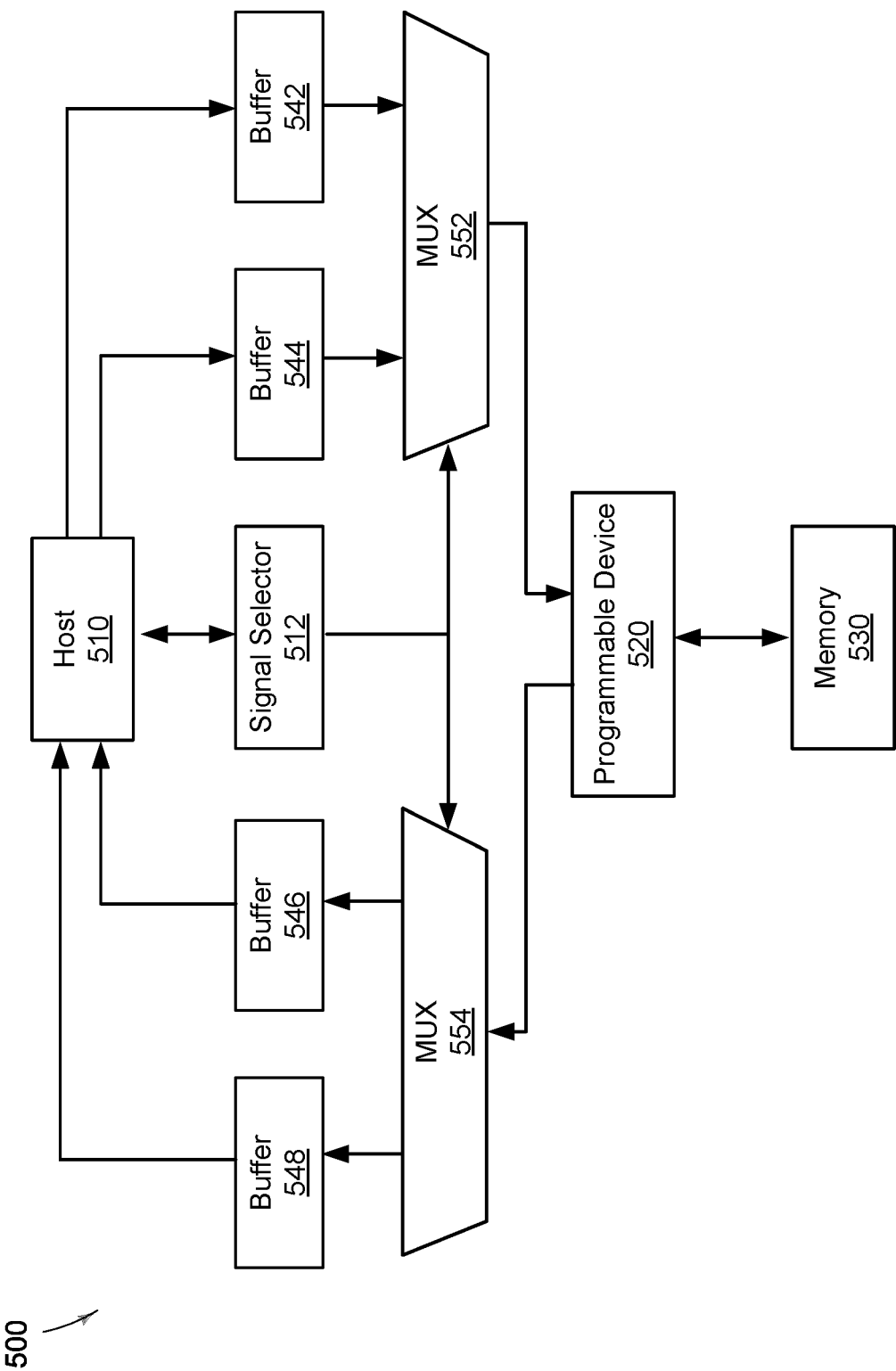

CONFIGURABLE OVERLAY ON WIDE MEMORY CHANNELS FOR EFFICIENT MEMORY ACCESS

TECHNICAL FIELD

Examples of the present disclosure generally relate to efficient memory accesses, and systems and circuits implementing such memory accesses.

BACKGROUND

Increase in real time data analytics has led to an increase in computationally intensive data systems. In general, data is first stored in memory and later accessed for analysis and processing. Generally, memory access for big data applications, e.g., random lookup in interlink tables or relational database, may cause bottleneck, which may lead to performance degradation. For a nonlimiting example, a processing unit, e.g., a CPU, may perform operations such as gather, join, etc., wherein gather operation is a type of memory addressing arising in addressing vectors in sparse linear algebra operations from Double Data Rate (DDR) channels and join operation is an SQL instruction that joins data or rows from two or more tables based on common fields between them. Unfortunately, many of these operations that the processing unit is tasked with involves inefficient memory access because of limited number of DDR channels, e.g., 4 channels. Inefficiency may further be exacerbated because the minimum number of read size is generally much larger, e.g., 64 Bytes, than the needed data size, e.g., 4 Bytes, etc., for processing.

SUMMARY

Examples described herein relate to improving memory access by processing units of a programmable device to improve processing by a host, e.g., a central processing unit (CPU). Memory access is improved by using a programmable device such as a field programmable gate array (FPGA). In some examples, the programmable device receives requests, e.g., read/write, etc., directly from DDR memory channels with on-chip memory controllers and random access units and accesses the memory in an efficient manner (for both read and write operations) and returns the content (for read operations) to the host for processing, thereby alleviating inefficiencies associated with memory access bottleneck. It is appreciated that in some examples, the programmable device interleaves the requests to memory channels (read operation or write operation) over multiple communication channels to access the memory. For write operations, the programmable device stores the content received from the host in memory and for read operations, the programmable device accesses the stored content on the memory, performs some operations on the content and can return the content to the host for further processing.

An example is a method for accessing memory. In one example, a read request or a write request is received from a host to fetch or to store content into or from a memory component. The read request or the write request has an address associated therewith. A communication channel from a plurality of communication channels for accessing the memory component is determined. The communication channel is determined based on a subset of bits within the address. The address is transmitted via the determined communication channel to fetch the content associated therewith for the read request. The address and content to be stored is transmitted via the determined communication channel for the write request. The fetched content is received from the memory component through the determined communication channel for the read request. The fetched content is transmitted to the host for the read request.

In some examples, the memory component is selected from a group consisting of a high bandwidth memory (HBM) and a DDR. In one example, a field programmable gate array (FPGA) receives the read request from the host.

In some examples, the determining includes selecting a same order bits of the subset of bits within each address of a read/write request of a plurality of read/write requests. In one example, the determining the communication channel uniformly distributes read and write requests from the host across the multiple communication channels. The method further includes remapping the address associated with read/write requests to a physical address in memory by using an offset, according to one example. In some examples, the method includes routing data between the multiple communication channels and a plurality of processing units.

In one example, the method may include, at a first instance in time, reading from one input buffer while simultaneously the host is writing into another input buffer. The method may further include, at the first instance in time, writing into one output buffer while simultaneously the host is reading from another output buffer. In some examples, the method may further include at a second instance in time, reading from the another input buffer while simultaneously the host is writing into the one input buffer. In one example, the method further includes, at the second instance in time, writing to the another output buffer while simultaneously the host is reading from the one output buffer.

In one example, the method includes switching between reading and writing to respective buffers at the first instance in time and the second instance in time. According to another example, the method further includes distributing data received from the host across a plurality of processing units.

In another example is a system for accessing memory. The system includes a programmable device, and a memory. The programmable device is coupled to the host. The programmable device is configured to receive the plurality of read/write requests and the addresses associated therewith from the host. The programmable device is further configured to interleave the plurality of read/write requests across multiple communication channels based on a subset of bits within each address. The memory is configured to receive the plurality of read/write requests from the programmable device. The memory is configured to store contents associated with the addresses for write requests and the memory is configured to return contents associated with the addresses for a read request to the programmable device. The programmable device is further configured to return the received contents to the host for processing.

In one example, the programmable device is a field programmable gate array (FPGA) and the host includes a processor and a DDR. In one example, the memory is selected from a group consisting of a high bandwidth memory (HBM) and a DDR.

According to one example, the interleaving is based on selecting a same order bits of the subset of bits within each address of a read/write request of the plurality of read/write requests. It is appreciated that in one example, the programmable device may be further configured to remap the address associated with each read/write request of the plurality of read/write requests to a physical address in the memory using an offset.

In one example, the interleaving uniformly distributes the plurality of read/write requests across the multiple communication channels. The interleaving increases efficiency associated with memory accesses by eliminating data replication, according to one example.

In one example, the programmable device includes a plurality of processing units. According to one example, data from the host is distributed across the plurality of processing units. It is appreciated that in one example, the programmable device further includes a switch configured to route data between the multiple communication channels and the plurality of processing units.

In one example, the system further includes two input buffers and two output buffers. At a first instance in time, one input buffer is being written to by the host while simultaneously another input buffer is being read from by the programmable device. Furthermore, at the first instance in time, one output buffer is being read from by the host while simultaneously another output buffer is being written to by the programmable device. In one example, at a second instance in time, the one input buffer is being read from by the programmable device while simultaneously the another input buffer is being written to by the host, and furthermore at the second instance in time the one output buffer is written to by the programmable device while simultaneously the another output buffer is being read from by the host. According to one example, the system further includes a first mux associated with the two input buffers and a second mux associated with the two output buffers. The first and the second mux are configured to switch between reading and writing to respective buffers at the first instance in time and the second instance in time.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIGS. 1A-1B show a block diagram depicting a system for accessing memory, according to some examples.

FIG. 2 shows another block diagram depicting a system for accessing memory, according to some examples.

FIG. 5 shows a block diagram depicting a system for communicating read/write requests from a host to and from a memory, according to some examples.

To facilitate understanding, identical reference numerals have been used, where possible, to designate identical elements that are common to the figures. It is contemplated that elements of one example may be beneficially incorporated in other examples.

DETAILED DESCRIPTION

Figure 3A:
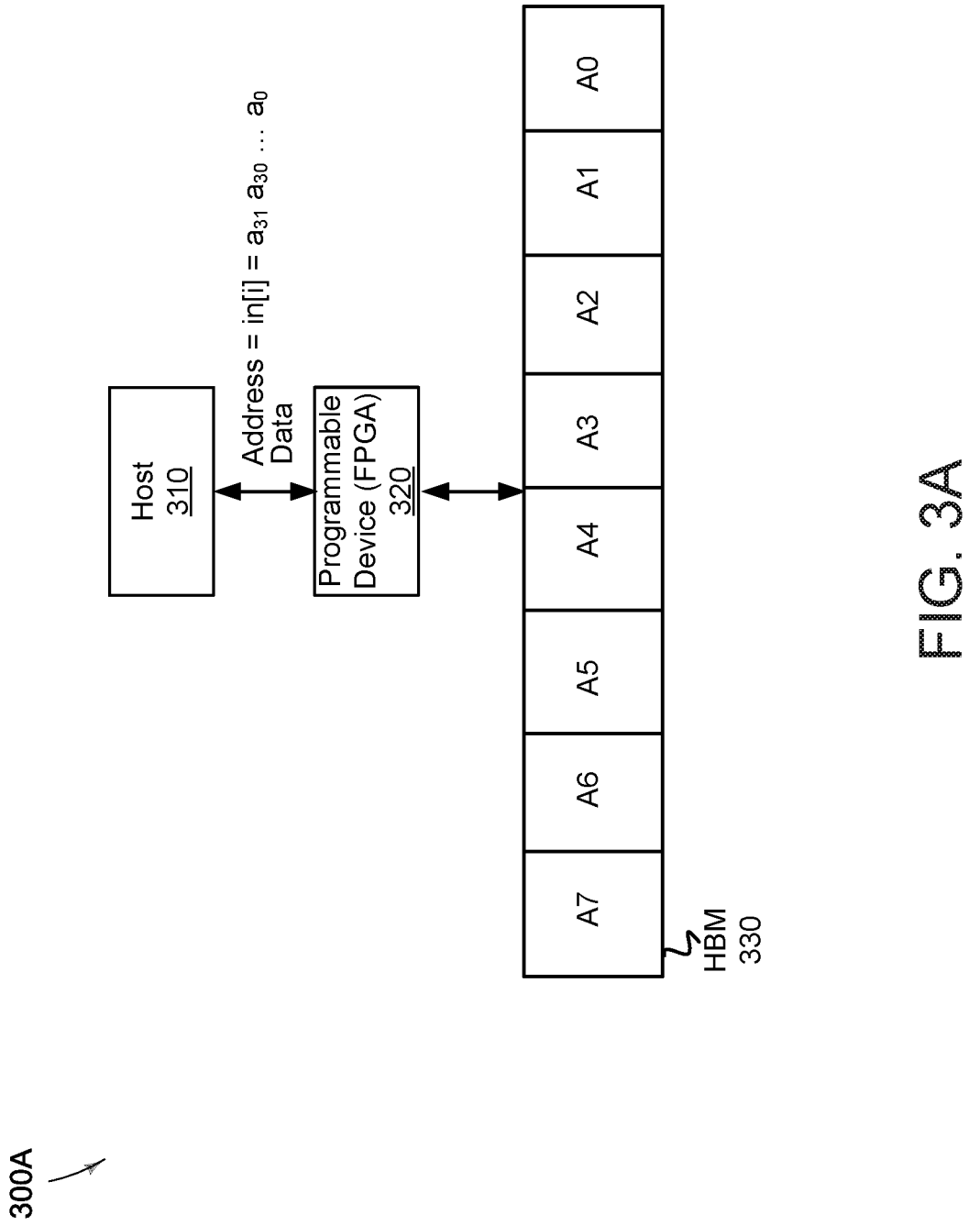
FIGS. 3A-3C show a block diagram depicting a system for reading/writing from/to memory, according to some examples.

Examples described herein relate to efficient memory accesses using a programmable device, such as an FPGA device. The programmable device may be used to access the memory in an efficient manner, thereby relieving the host from accessing memory, which has proven to be inefficient. The programmable device receives read/write requests from the host. The address associated with the read/write requests may be interleaved on multiple communication channels of the programmable device. For example, a subset of bits within each address, e.g., the least 3 significant bits, the highest 4 significant bits, the third least significant bit and a seventh least significant bit, etc. may be utilized to determine the appropriate communication channel of the programmable device, e.g., in an 8, 16, and 4 channel system respectively, that the read/write request is to be communicated from, thereby interleaving the requests across multiple communication channels of the programmable device. It is appreciated that using 3 bits as the subset of the address is for illustration purposes and should not be construed as limiting the scope of the examples. For example, 4 bits may be used in a 16 channel system, 5 bits may be used in a 32 channel system, etc. Furthermore, it is appreciated that any order bits associated with the subset bits of each address may also be used, e.g., zeroth order bit, a third order bit, a ninth order bit, and a twenty first order bit of the address may be used in a 16 channel system or the least three significant bits of the address may be used in an 8 channel system, etc. Thus, the use of the least significant bits is for illustrative purposes and should not be construed as limiting the examples.

Accordingly, the programmable device uses a subset of bits of each address is used to interleave the read/write request from the host onto a memory component, e.g., a high bandwidth memory (HBM), DDR, etc. For example, the subset of bits is used to determine the communication channel of the programmable device. The memory component is then accessed via the determined communication channel, and for a write request the content is stored in the appropriate address in the memory, and for a read request the content is read from the appropriate address in the memory. For read requests, the content is read back in a similar fashion via the same communication channel that the memory was accessed from. The content is then transmitted from the memory component to the programmable device which then transmits the content to the host for further processing. As such, the bottleneck issues associated with inefficiencies arising from the host accessing the memory component are eliminated by leveraging communication channels of the programmable device to interleave the read/write requests to access the memory. Furthermore, interleaving the requests on multiple communication channels eliminates data replication, resulting in higher efficiency.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. For example, various methods according to some examples can include more or fewer operations, and the sequence of operations in various methods according to examples may be different than described herein. In addition, an illustrated example need not have all the aspects or advantages shown. An aspect or an advantage described in conjunction with a particular example is not necessarily limited to that example and can be practiced in any other examples even if not so illustrated or if not so explicitly described.

Some general concepts will first be described to clarify terms and nomenclature used throughout this description.

FIGS. 1A-1B show a block diagram depicting a system for accessing memory, according to some examples. Referring specifically to FIG. 1, a block diagram 100A is shown. The block diagram 100A includes a host 110, e.g., processing unit, a central processing unit (CPU), a graphics pipeline unit (GPU), etc., coupled to a programmable device 120 which is further coupled to a memory component 130. The memory component 130 may include hard disk drives, solid state drives, etc., that store content in tables, relational database, etc. In some examples, the host 110 may transmit memory access requests, e.g., read/write requests. For example, the host 110 may transmit a write request to store content in the memory component 130 for later retrieval and processing or the host 110 may transmit a read request to access the stored content from the memory component 130 for processing. It is appreciated that the host may transfer these requests in blocks of data.

As described above, the host 110 accessing the memory 130 causes bottleneck and inefficiencies. As such, the programmable device 120, e.g., an FPGA, a programmable logic device, etc. may be used. The programmable device 120 receives read/write requests from the host 110 in order to access the memory 130 in an efficient manner and return any requested content from the memory 130 back to the host 110 for processing. In some examples, the programmable device 120 uses a subset of bits within the address of the request that is received from the host 110 to identify the appropriate communication channel (described in detail in FIGS. 3A-4, and 6 below). The programmable device 120 identifies the appropriate communication channel for each request received from the host 110, thereby interleaving the requests across multiple communication channels. It is appreciated that in some examples, the interleaving is uniform.

The programmable device 120, therefore accesses the memory component 130 in efficient manner. The memory component 130 receives the address associated with the request via the determined communication channel from the programmable device 120. For example, the address of the request may be received via a third channel at the memory component 130. The memory component 130 may then store the content associated with the address for a write request or provide the content associated with the address for a read request. The content for a read request may then be transmitted through the same communication channel from the memory component 130 back to the programmable device 120. The programmable device 120 transmits the content associated with the address of the read request back to the host 110 for further processing.

Referring now to FIG. 1B, a block diagram 100B is depicted that is substantially similar to that described in FIG. 1A. In block diagram 100B, however, the host 110 includes a CPU 112 and a DDR 114 memory. The CPU 112 may be used to process data. The DDR 114 memory may be used to locally store the content for processing or content to be stored in the memory component 130 prior to its storage.

FIG. 2 shows another block diagram depicting a system for accessing memory, according to some examples. The system 200 is substantially similar to that of FIGS. 1A-1B and operate substantially similar to that of FIGS. 1A-1B. System 200 includes a host 210 coupled to the programmable device 120 which is coupled to a memory component 230. The host 210 is substantially similar to the host 110 and operates in similar fashion and the memory component 230 is substantially similar to the memory component 130 and operates in similar fashion. In this example, the host 210 is an x86 processor and the memory component may be DDR, HBM, etc. It is appreciated that in some examples the programmable device 120 includes interface 222 to facilitate communication to the memory 230. In some examples the interface 222 is an HBM interface to facilitate communication with HBM memory and in other examples the interface 222 is a DDR interface to facilities communication with DDR memory. It is appreciated that in some examples the interface 222 may include more than one interface to be capable to communicate with different types of memory.

Figure 3B:
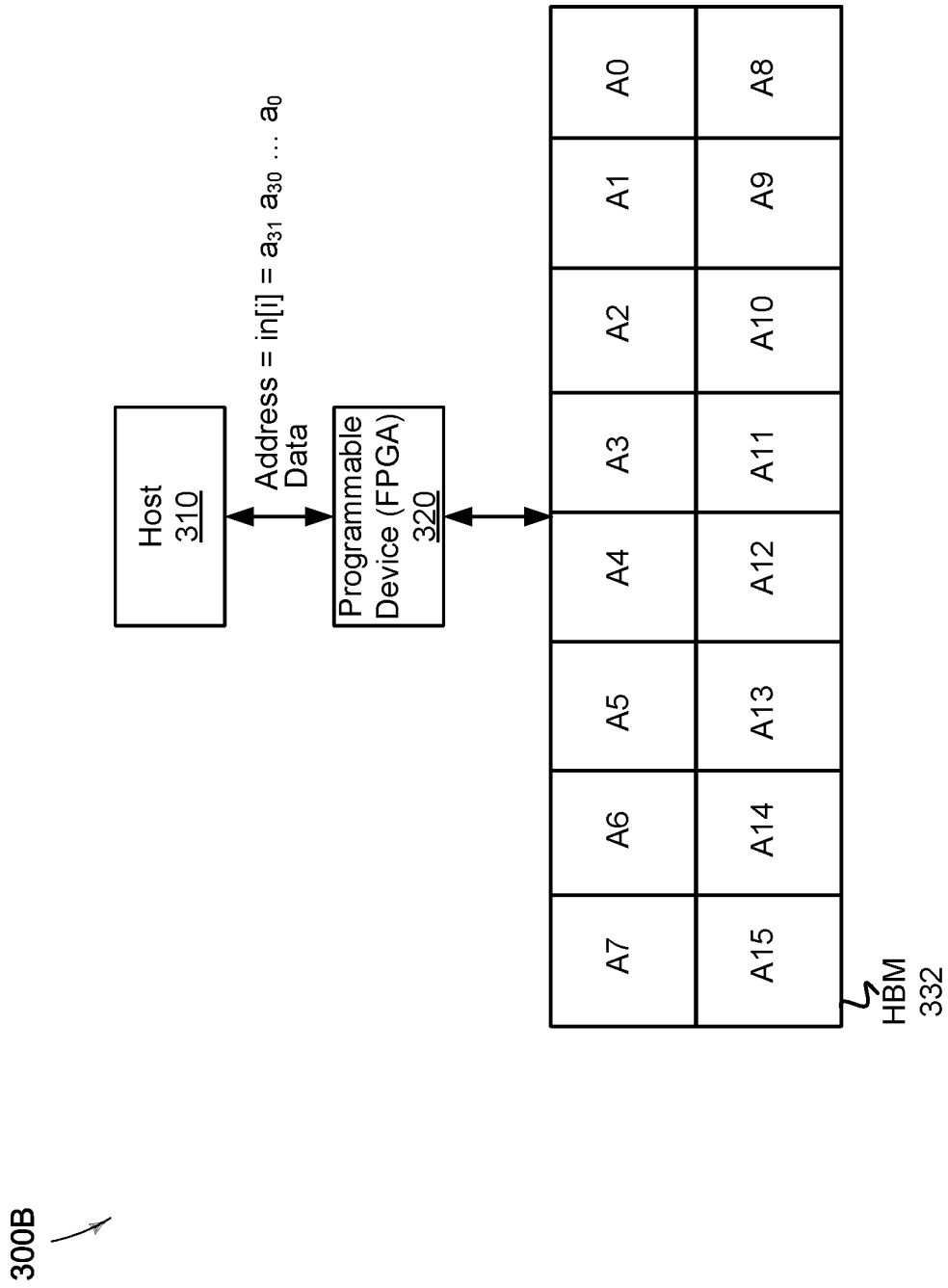
Figure 3C:
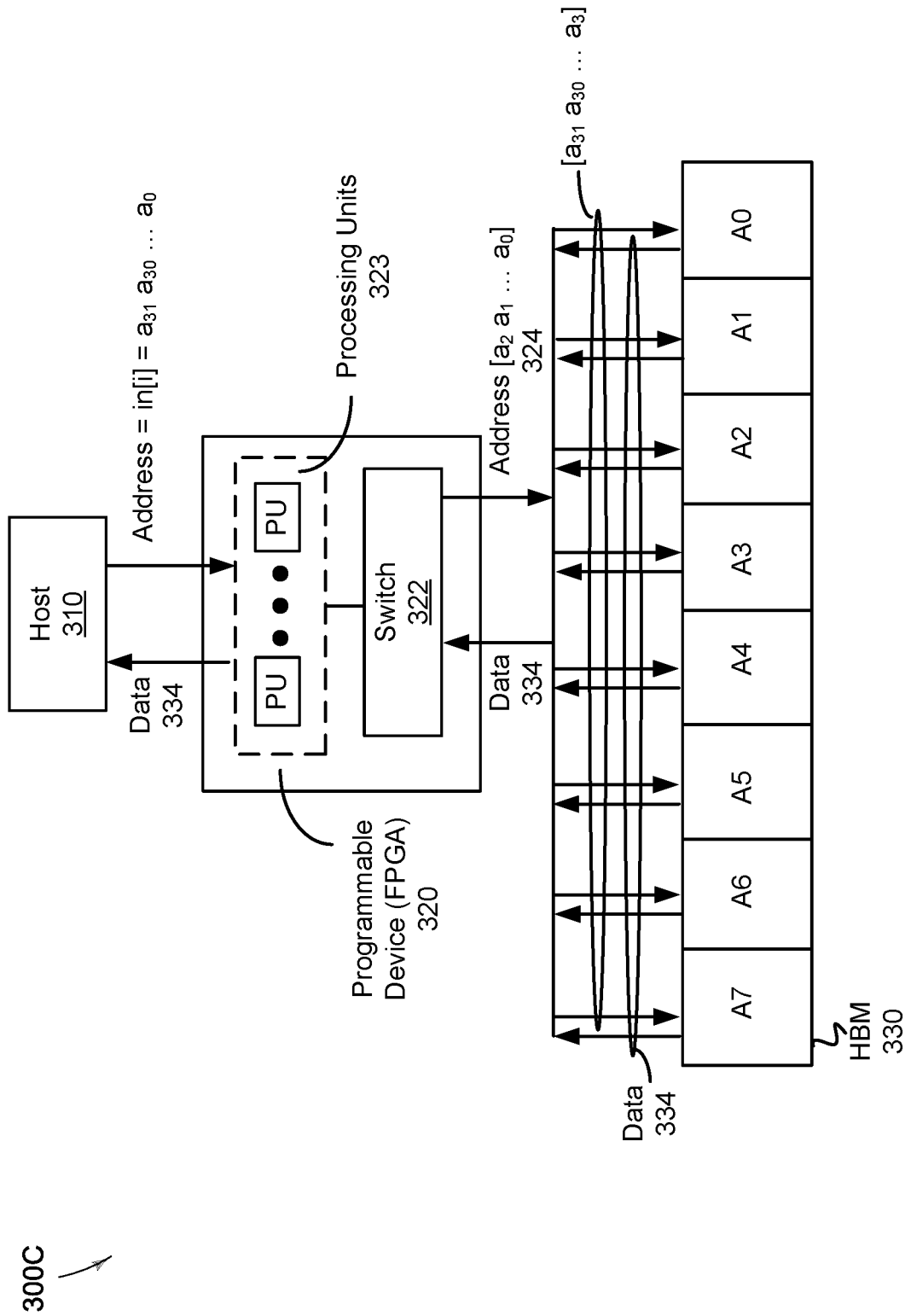

FIGS. 3A-3C show a block diagram depicting a system for reading/writing from/to memory, according to some examples. Referring specifically to FIG. 3A, system 300A for reading/writing from/to memory is shown. System 300A operates substantially similar to that of FIGS. 1A-2. The system 300A includes a host 310 coupled to a programmable device 320, which is coupled to an HBM 330. The host 310 and the programmable device 320 are substantially similar to the host and the programmable device as described in FIGS. 1A-2. The HBM 330 in this example includes 8 channels and 8 HBMs, A0, A1, . . . , A7. In this example, the host 310 transmits read/write request to the programmable device 320. For example, the host 310 may transmit an address in[i] associated with a location in memory, which is associated with the read/write request. In the example described the address is 32 bits $a_{31}, a_{30}, a_{29}, \ldots a_0$. It is appreciated that description of the example with 8 communication channels and a 32-bit address is for illustrative purposes and should not be construed as limiting the examples.

The programmable device 320 may use a subset of the bits for each address to interleave the requests from the host 310 across multiple communication channels and HBMs, e.g., A0, A1, . . . , A7. In this example since 8 communication channels are used the subset of bits may include only 3 bits. In some examples, the least 3 significant bits for each address may be used. For a nonlimiting example, 3 least significant bits of 000 may be mapped to A0, whereas 001 may be mapped to A1, whereas 010 may be mapped to A2, etc. It is appreciated that the mapping may be done in any suitable fashion and any suitable subset of bits may be used. For example, 3 most significant bits may be used in one example, whereas in other implementations a first order bit corresponding to $a_1$, a seventh order bit corresponding to $a_7$, and a twenty sixth order bit corresponding to $a_{26}$ may be used. As such, the description with respect to the least significant bits is for illustration purposes only and should not be construed as limiting the examples. It is appreciated that in some examples, the programmable device 320 is configured to remap the address associated with each read/write request, e.g., in[i], of the plurality of read/write requests to a physical address, e.g., $a_{31}, a_{30}, a_{29}, \ldots, a_0$, in the memory through appropriate communication channel, e.g., A0, A1, . . . , A7, using an offset. It is appreciated that a single bus is depicted between components, e.g., a single bus between the programmable device and the host. However, it is appreciated that the bus may comprise multiple buses, e.g., one bus to transmit address, one bus to transmit data, etc. As such, depiction of a single bus should not be construed as limiting the scope and is for illustrative purposes only.

Referring now to FIG. 3B, system 300B is shown that is substantially similar to that of FIG. 3A and operates substantially similar to that described therein. However, system 300B includes a stacked HBM 332. In this example, appropriate communication channels may be used to communicate with the corresponding HBM A0, A1, . . . , A15. Stacked HBM 332 results in higher performance in comparison to the HBM 330.

Referring now to FIG. 3C, system 300C is shown that is substantially similar to that of FIGS. 3A and 3B. Read/write requests from the host 310 are described herein. First, a write request operation from the host 310 to HBM 330 is described.

In some examples, the host 310 transmits the address in[i]=$a_{31}$, $a_{30}$, $a_{29}$, . . . , $a_0$ associated with a memory location for the write request to the programmable device 320. The programmable device 320 may include some processing units 323 configured to process requests from the host 310. In this example, the processing units 323 process the write request from the host 310. As such, the processing units 323 determine the appropriate communication channel associated with the write request to communicate to the HBM 330. In this illustrative example, the least 3 significant bits of the address associated with the write request, [$a_2$, $a_1$, $a_0$], are used to determine the appropriate communication channel.

In this illustrative example 3 bits, hence a subset of the address, are used because the system includes 8-channel communication to communicate with HBM 330. In other examples, a 16-channel communication may need 4 bits, a 32-channel communication may need 5 bits, etc. to determine the appropriate communication channel. Thus, the use of 3 bits of a 32-bit address to identify the appropriate communication channel for an 8-channel HBM is for illustration purposes and should not be construed as limiting the scope of the examples. Furthermore, as described above, use of the least 3 significant bits, hence the order bits, is for illustrative purposes and any order bits of the address may be used and use of the least 3 significant bits should not be construed as limiting the scope of the examples.

In some examples, [0 0 0] is mapped to A0, [0 0 1] is mapped to A1, [0 1 0] is mapped to A2, [1 0 0] is mapped to A3, [0 1 1] is mapped to A4, [1 0 1] is mapped to A5, [1 1 1] is mapped to A6, and [0 1 1] is mapped to A7. However, it is appreciated that other mappings may be used and the mapping, as described, is for illustrative purposes and should not be used to limit the scope of the examples. Accordingly, the processing units 323 process the write request from the host 310 and use a subset of the address associated with the request, [$a_2$, $a_1$, $a_0$], to determine the appropriate communication channel. Once the appropriate channel is determined, the switch 322 in the programmable device 320 is manipulated to route the write request to the appropriate HBM 330. For example, based on [$a_2$, $a_1$, $a_0$] of [1 0 1] it may be determined that the write request is to write to A5 HBM 330. Accordingly, the switch 322 routes the address 324 in[i]=$a_{31}$, $a_{30}$, $a_{29}$, . . . , $a_0$ associated with a memory location for the write request, to A5 of HBM 330 along with the data to be stored. In some examples, the switch 322 routes the remainder of the address 324 in[i]=$a_{31}$, $a_{30}$, $a_{29}$, . . . , $a_3$ only along with the data because by determining the appropriate communication channel the least 3 significant bits of the address is known. As such, the data associated with the write request is stored and can be later accessed. Accordingly, the programmable device 320 is used to efficiently access memory, e.g., HBM 330, rather than using the host 310 directly accessing the memory that causes bottleneck and inefficiencies. The programmable device 320 therefore interleaves the requests and in some examples the programmable device 320 interleaves the requests in a uniform fashion. It is appreciated that in some examples the interleaving may be achieved by using an offset to map the address associated with the request to a physical address in the memory.

Now, the operation of a read request from the host 310 is described. The read request is transmitted from the host 310 to the programmable in a similar fashion as the write request. For a read request, however, no data is transmitted with the address associated therewith. Once a subset of the address, e.g., 3 least significant bits in this example, is used to determine the HBM channel, the address may be routed via the switch 322. For example, the 3 least significant bits [$a_2$, $a_1$, $a_0$] of [0 1 1] for a read request may be used to identify A7 as the appropriate communication channel of the HBM 330. In another example, the 3 least significant bits [$a_2$, $a_1$, $a_0$] of [0 0 1] for a read request may be used to identify A1 as the appropriate communication channel of the HBM 330. The address 324 in[i]=$a_{31}$, $a_{30}$, $a_{29}$, . . . , $a_0$ associated with a memory location for the read request may thus be transmitted through the appropriate communication channel to access the appropriate location of the HBM 330, e.g., A7, A1, etc. As described above, in some examples, the transmitted address from the programmable device 320 to the HBM 330 may not require the 3 least significant bits because they are known since the appropriate communication channel is determined in that fashion. It is appreciated that referenced to HBM channels may refer to either pseudo channels or physical. It is further appreciated that any references to HBM channels are for illustrative purposes and should not be construed as limiting the scope of the examples.

The address may then be used to access the appropriate memory location, e.g., A7, A0, etc. The content data 334 associated with the address may then be returned from the HBM 330 via the same communication channel to the programmable device 320 and ultimately transmitted from the programmable device 320 to the host 310 for processing. Accordingly, the programmable device 320 is used to efficiently access memory, e.g., HBM 330, rather than using the host 310 directly accessing the memory that causes bottleneck and inefficiencies. The programmable device 320 therefore interleaves the requests and in some examples the programmable device 320 interleaves the requests in a uniform fashion. It is appreciated that in some examples the interleaving may be achieved by using an offset to map the address associated with the request to a physical address in the memory. Furthermore, interleaving the requests on multiple communication channels eliminates data replication, resulting in higher efficiency.

Figure 4:
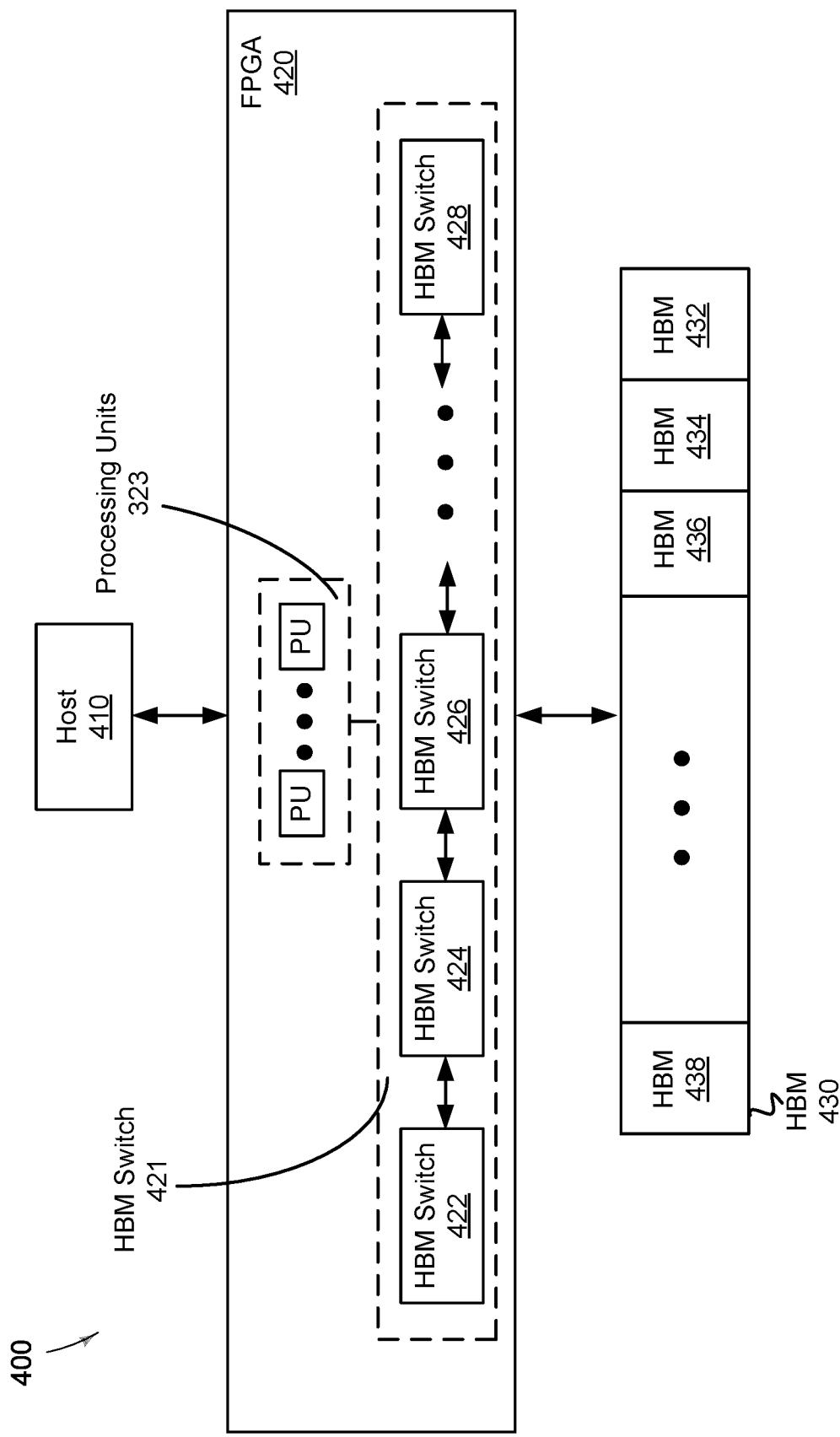
FIG. 4 shows a block diagram depicting another system for accessing memory, according to some examples.

FIG. 4 shows a block diagram depicting another system for accessing memory, according to some examples. System 400 is similar to the system described in FIGS. 3A-3C. The system 400 includes a host 410, an FPGA 420 and HBM 430. The host 410 is similar to the host 310. The FPGA 420 is similar to the programmable device 320 and it includes processing units 323. In some examples, the FPGA 420 includes a set of HBM switches 421. In this example the set of HBM switches 421 includes multiple HBM switches 422, 424, 426, . . . , 428. It is appreciated that any number of HBM switches may be used and the number of HBM switches shown and described is for illustrative purposes and should not be construed as limiting the scope of the examples. The HBM switches 421 route the requests from the host 410 to the appropriate HBM channel to the appropriate HBM, e.g., HBM 432, HBM 434, HBM 436, . . . , HBM 438, similar to FIGS. 3A-3C. Similarly, the content may be transmitted from the accessed HBM location to the FPGA 420 and ultimately to the host 410 for processing.

It is appreciated that the time it may be required for accessing a memory using the host without using a programmable device may be 780 ms. The access and efficiency are greatly improved by using the examples described above in FIGS. 1A-4. The number of HBM channels and the number of processing units can be varied to impact the efficiency. The table below shows the improvement over different HBM channels and number of processing units.

|  |  | NUMBER OF PROCESSING UNITS | | | | |
| --- | --- | --- | --- | --- | --- | --- |
| Time in ms |  | 16 | 8 | 4 | 2 | 1 |
| HBM | 8 | 112 | 162 | 288 | 531 | 978 |
| CHANNELS | 4 | 172 | 184 | 287 | 501 | 935 |
|  | 2 | 275 | 274 | 327 | 492 | 858 |
|  | 1 | 269 | 268 | 313 | 463 | 813 |

As shown with an 8 channel design the access time is improved from 780 ms to 112 ms using 16 processing units. It is appreciated that the performance can further be improved by reducing the access time by approximately 4 times by using a 32 pseudo channel across two stacks. The time reduction and increase in efficiency can be significant for random memory accesses for databases, relational databases, interlink tables, etc. and related operations and requests such as hash-probe, hash-build, hash-join, direct random lookup across many queries, etc.

FIG. 5 shows a block diagram depicting a system for communicating read/write requests between a host and a memory, according to some examples. System 500 is similar to that of FIGS. 1A-4, described above. Accordingly, the host 510, the programmable device 520, and the memory 530 are substantially similar to and operate in a similar fashion as in FIGS. 1A-4. In FIG. 5, a method by which requests from the host 510 is communicated to the programmable device 520 and the responses from the programmable device 520 is communicated to the host 510 is illustrated in one example. The host 510 is coupled to the programmable device 520 through a signal selector 512, input buffers 542 and 544, output buffers 546 and 548, an input mux 552 and an output mux 554.

It is appreciated that in some examples, at any given point in time, when one input buffer is being written to by the host 510, another input buffer is being read from by the programmable device 520. For example, if the buffer 542 is being written to by the host 510, the input buffer 544 is being read from by the programmable device 520. In other words, the previously requests written by the host 510 into the input buffer 544 are being read by the programmable device 520 as the buffer 542 is being written to by the host 510 simultaneously.

Similarly, it is appreciated that in some examples, at any given point in time, when one output buffer is being read from by the host 510, another output buffer is being written to by the programmable device 520. For example, if the buffer 546 is being read by the host 510, the output buffer 548 is being written to by the programmable device 520. In other words, the previous content written by the programmable device 520 into the output buffer 546 is being read by the host 510 as the buffer 548 is being written to by the programmable device 520 simultaneously.

It is appreciated that subsequent to the read and write from/to the input and output buffers, as described above, by the host 510 and the programmable device 520, the read/write to/from the input and output buffers is reversed. For example, the buffer 544 is being written to by the host 510, the input buffer 542 is being read from by the programmable device 520. In other words, the previously requests written by the host 510 into the input buffer 542 are being read by the programmable device 520 as the buffer 544 is being written to by the host 510 simultaneously. Similarly, the buffer 548 is being read by the host 510, the output buffer 546 is being written to by the programmable device 520. In other words, the previous content written by the programmable device 520 into the output buffer 548 is being read by the host 510 as the buffer 546 is being written to by the programmable device 520 simultaneously The signal selector 512 is configured to control the mux 552 and 554 in order to control the read and write to/from the buffers 542-548 in the ping-pong fashion, as described above. For example, the select signal from the signal selector 512 may cause the mux 552 to transmit the content of the appropriate buffer 542 or 544 to the programmable device while the other buffer is being written to by the host 510 simultaneously. Similarly, the select signal from the signal selector 512 may cause the mux 554 to transmit that content of the appropriate buffer 546 or 548 to the host 510 while the other buffer is being written to by the programmable device 520 simultaneously.

Figure 6A:
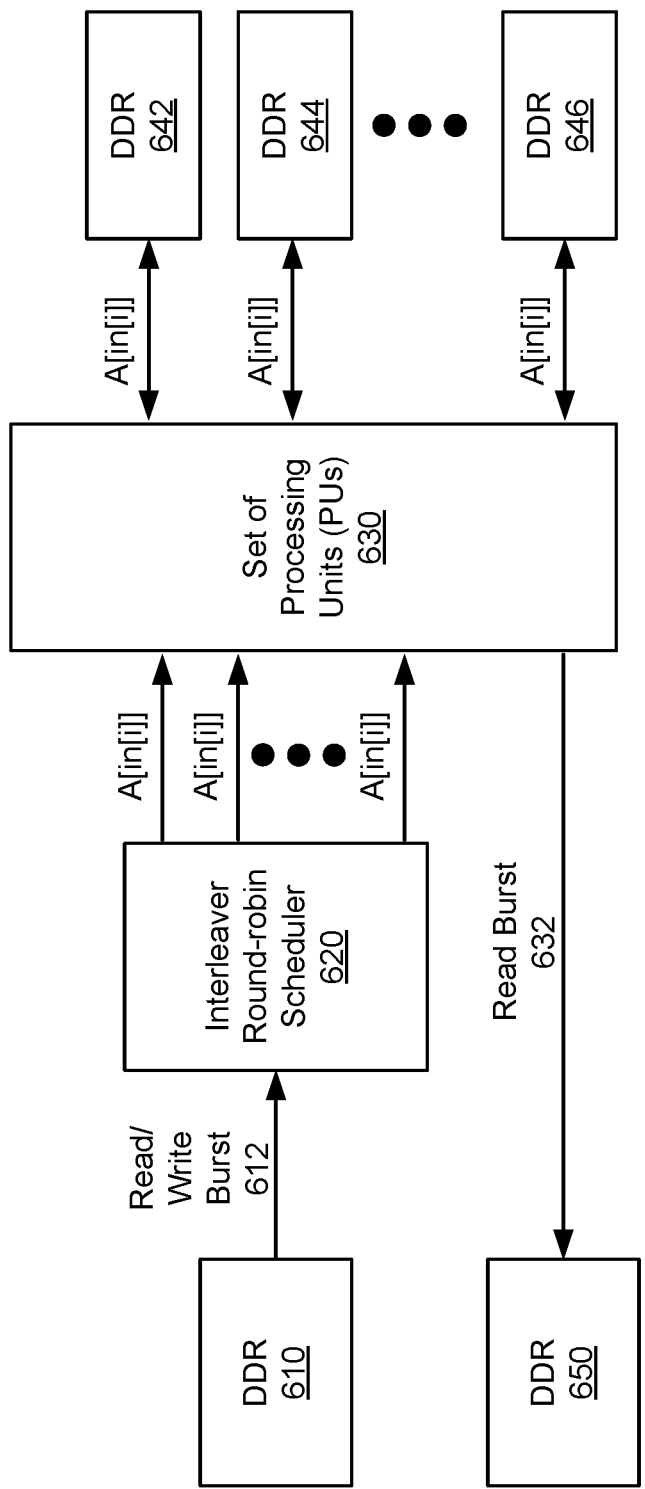
FIG. 6A shows a block diagram depicting memory access implementation in a programmable device, according to some examples.

FIG. 6A shows a block diagram depicting memory access implementation in a programmable device, according to some examples. FIG. 6 is depicted using DDR, however, the examples are not limited to DDR. For example, HBM or other types of memory may be used. In this example, the operations as described in FIGS. 1A-5, are implemented within the fabric of the programmable device, e.g., FPGA. The DDR 610 is a memory component that receives the requests from the host (not shown). The interleaver round-robin scheduler 620 is configured to interleave the received requests stored in DDR 610, as described above with respect to FIGS. 1A-5. The interleaved requests are transmitted to a set of processing units (Pus) 630 such that the requests in the interleaved fashion are transmitted via their appropriate communication channels, e.g., DDR 642, 644, . . . , 646, to the memory. As described above, the memory returns the content, e.g., for a read request, via the communication channel that the request has been received from, to the set of PUs 630. The received content, e.g., read burst 632, may be transmitted to DDR 650 such that it can be transmitted to the host for processing.

Figure 6B:
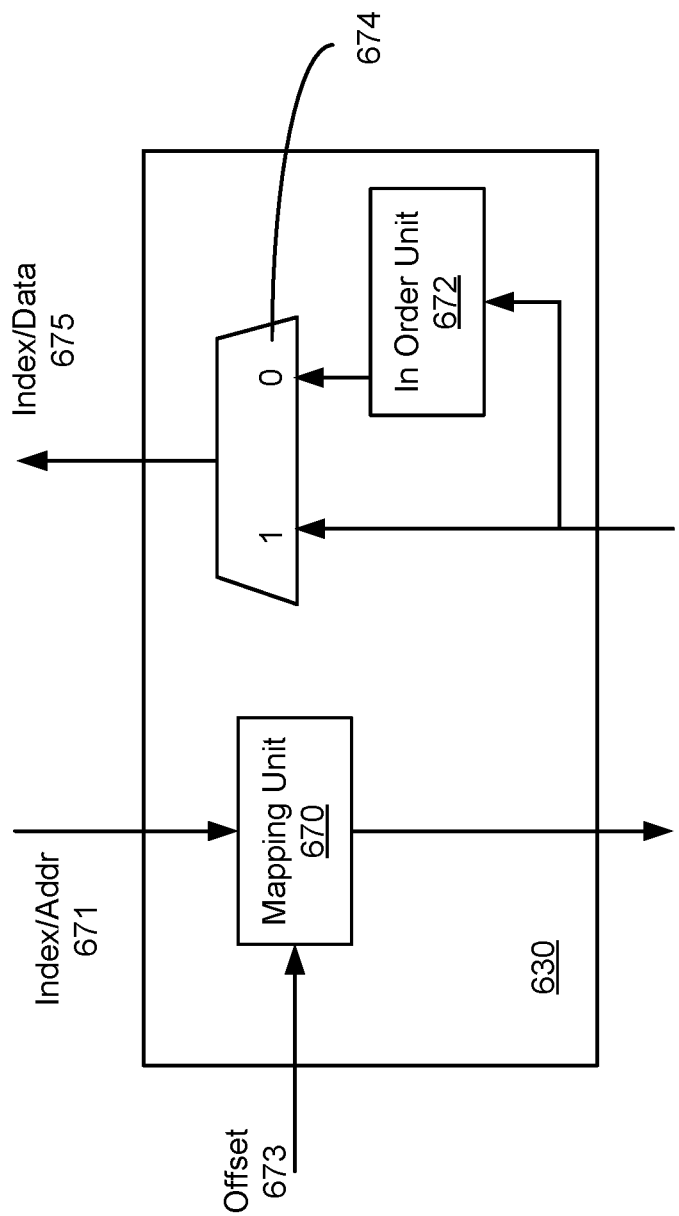
FIG. 6B shows a diagram depicting processing units (PUs) in a programable device, according to some examples.

FIG. 6B shows a diagram depicting processing units (PUs) in a programmable device, according to some examples. PUs 630 in some examples include a mapping unit 670, an in-order unit 672 and a multiplexer 674. The mapping unit 670 receives the data 671 that may include an index, e.g., for a read request, for a write request, etc. The received data 671 is transmitted o the memory channel with an offset 673. As described above, for the write request the content is stored. For read request, the content is fetched, as described above, and transmitted to the in-order unit 672 and to the multiplexer 674. If the fetched data is out of order, the index is tagged back to the read data and if the received data is in-order data then the index is in the correct order. The fetched content is output as index/data 675. It is appreciated that in the illustrated example a caching mechanism is implemented, thereby enabling the data to be maintained without sending a request back.

Figure 7A:
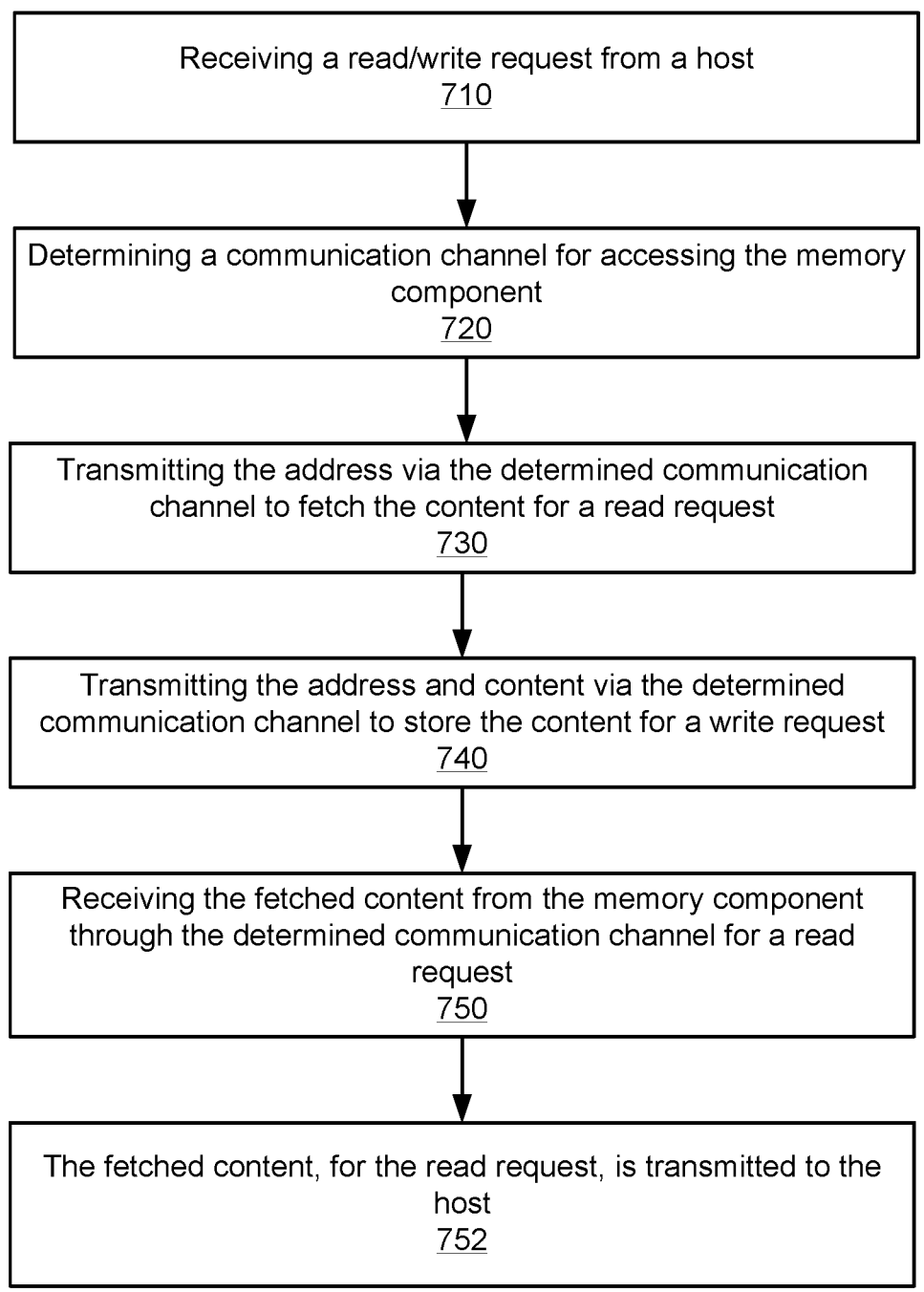
FIGS. 7A-7B show a method flow for accessing memory and routing requests between a host and a programmable device, according to some examples.

FIG. 7A shows a method flow 700A for accessing memory, according to some examples. It is appreciated that the method flow 700A is a method describing the operation, as described by FIGS. 1A-6. At step 710, a read request or a write request is received from a host to fetch or to store content into or from a memory component. The read request or the write request has an address associated therewith. It is appreciated that the request may be single request or a block of requests. At step 720, a communication channel is determined from a plurality of communication channels for accessing the memory component. The communication channel is determined based on a subset of bits within the address. In some examples, the communication channel is determined based on the same order bits of the subset of bits within each address associated with the read/write request that are received from the host. At step 730, the address via the determined communication channel is transmitted to fetch the content associated therewith for the read request. At step 740, the address and the content to be stored via the determined communication channel are transmitted for the write request. At step 750, the fetched content from the memory component is received through the determined communication channel for the read request. At step 752, the fetched content, for the read request, is transmitted to the host.

As presented above, the memory component may be HBM, DDR, etc. In some examples, the programmable device may be an FPGA that receives the read/write requests from the host. It is appreciated that determining the communication channel, as described in step 720, may be performed to distribute the requests from the host uniformly across multiple communication channels.

In some examples, the method may further include remapping address associated with the requests, e.g., read, write, etc. to a physical address in memory by using an offset. It is appreciated that the method may further include routing data between multiple communication channels and processing units within the programmable device.

Figure 7B:
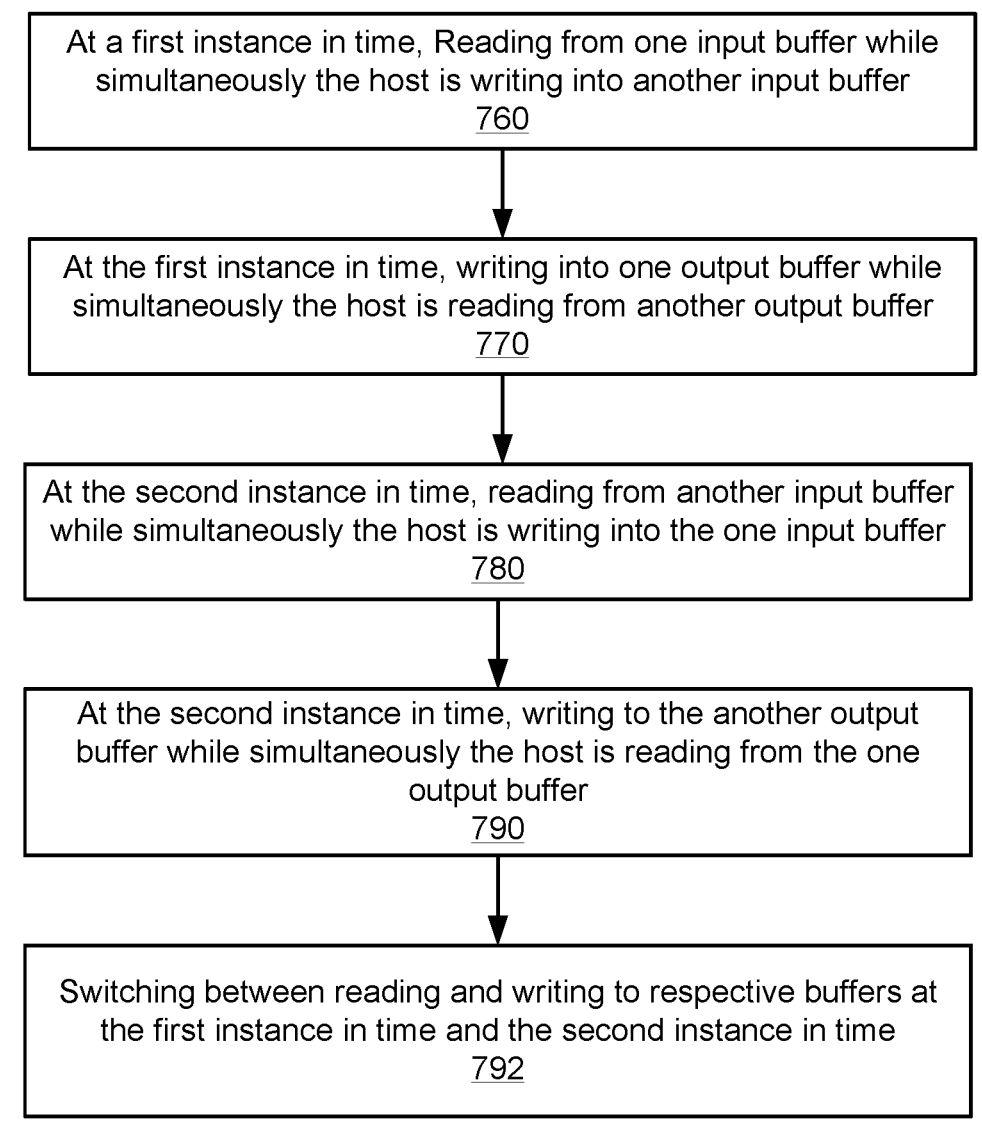

Referring now to FIG. 7B, a method flow 700B for routing the requests between the host and the programmable device according to some examples is shown. At step 760, at a first instance in time, content from one input buffer is being read while simultaneously the host is writing into another input buffer, as described in FIG. 5. At step 770, at the first instance in time, the one output buffer is being written to while simultaneously the host is reading from another output buffer, as described in FIG. 5. At step 780, at a second instance in time, content from another input buffer is being read while simultaneously the host is writing into the one input buffer, as described in FIG. 5. At step 790, at the second instance in time, the another output buffer is being written to while simultaneously the host is reading from the one output buffer, as described in FIG. 5. At step 792, the method may further include switching between reading and writing to respective buffers at the first instance in time and the second instance in time, as described with respect to FIG. 5.

Figure 8:
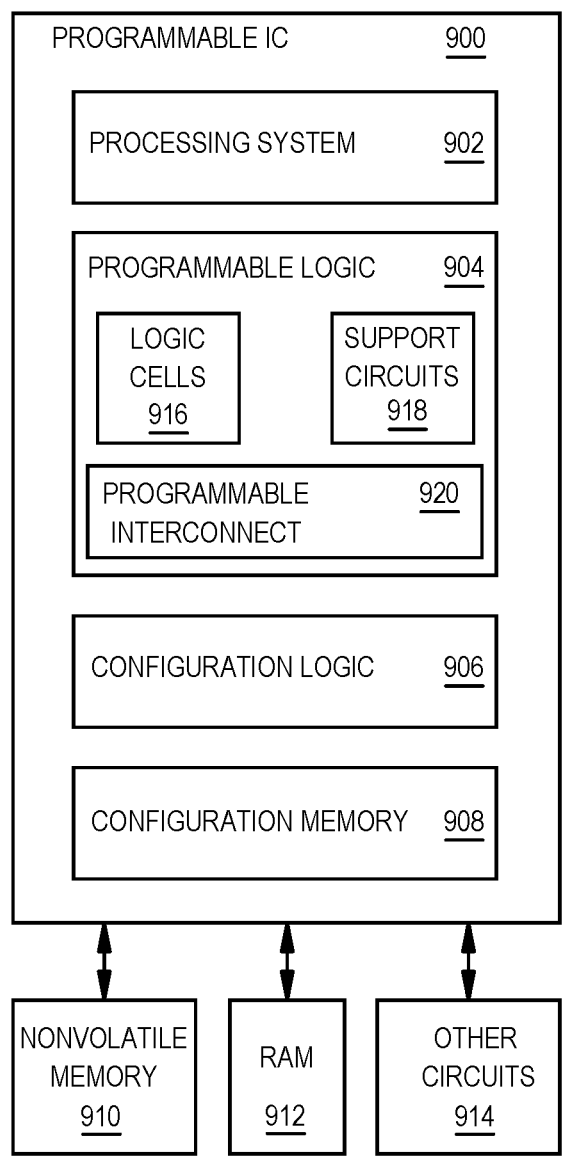
FIG. 8 is a block diagram depicting a programmable integrated circuit (IC), according to some examples.

FIG. 8 is a block diagram depicting a programmable integrated circuit (IC) 900 according to an example. The programmable IC 900 can implement the integrated circuit (IC) chip of systems of FIGS. 1A-6, in whole or in part. The programmable IC 900 includes a processing system 902, programmable logic 904, configuration logic 906, and configuration memory 908. The programmable IC 900 can be coupled to external circuits, such as nonvolatile memory 910, RAM 912, and other circuits 914.

The processing system 902 can include microprocessor(s), memory, support circuits, IO circuits, and the like. The programmable logic 904 includes logic cells 916, support circuits 918, and programmable interconnect 920. The logic cells 916 include circuits that can be configured to implement general logic functions of a plurality of inputs. The support circuits 918 include dedicated circuits, such as transceivers, input/output blocks, digital signal processors, memories, and the like. The logic cells and the support circuits 918 can be interconnected using the programmable interconnect 920. Information for programming the logic cells 916, for setting parameters of the support circuits 918, and for programming the programmable interconnect 920 is stored in the configuration memory 908 by the configuration logic 906. The configuration logic 906 can obtain the configuration data from the nonvolatile memory 910 or any other source (e.g., the RAM 912 or from the other circuits 914).

Figure 9:
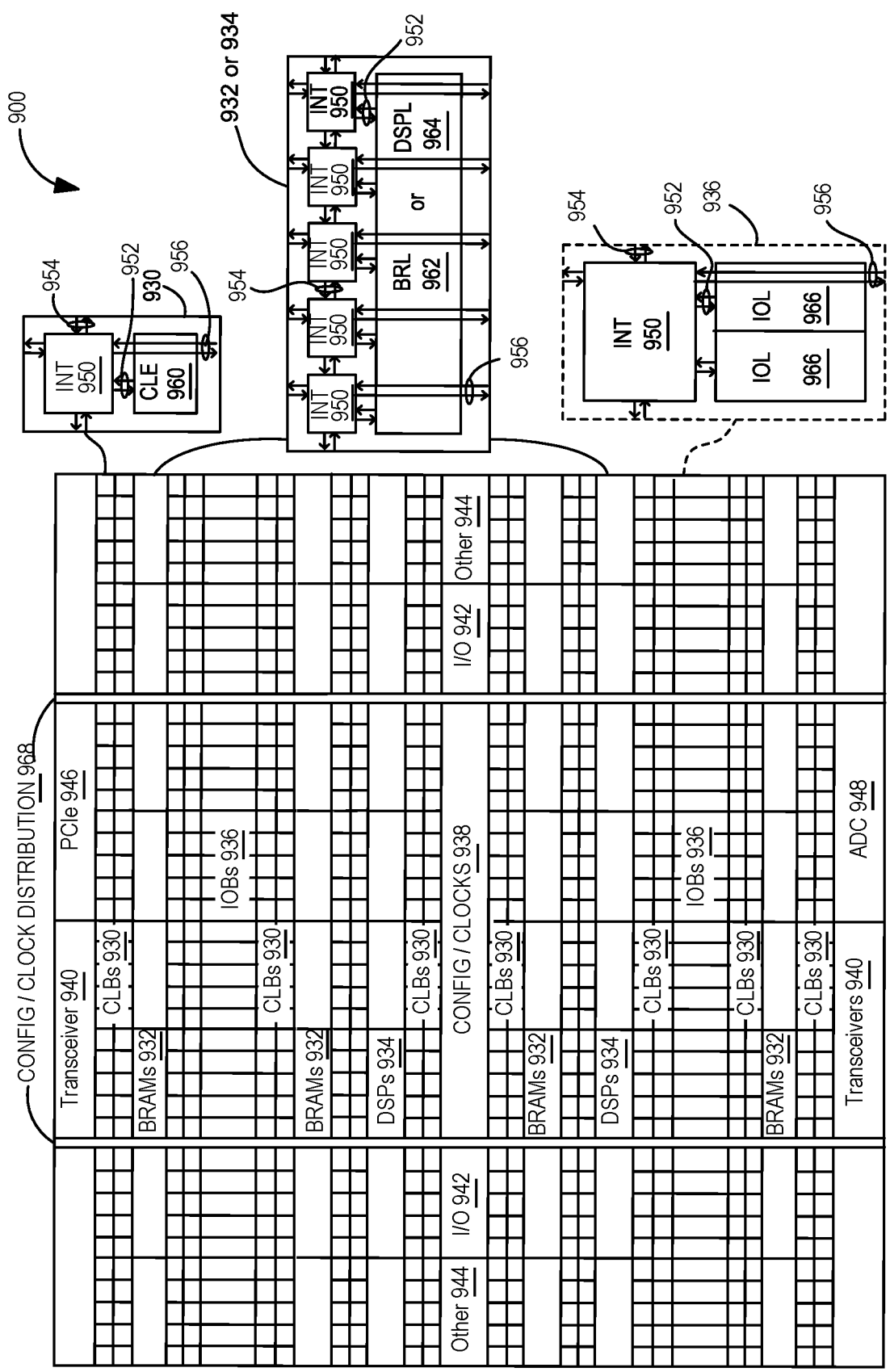
FIG. 9 is a field programmable gate array (FPGA) implementation of the programmable IC, according to some examples.

FIG. 9 illustrates an FPGA implementation of the programmable IC 900 that includes a large number of different programmable tiles including configurable logic blocks ("CLBs") 930, random access memory blocks ("BRAMs") 932, signal processing blocks ("DSPs") 934, input/output blocks ("IOBs") 936, configuration and clocking logic ("CONFIG/CLOCKS") 938, digital transceivers 940, specialized input/output blocks ("I/O") 942 (e.g., configuration ports and clock ports), and other programmable logic 944 such as digital clock managers, system monitoring logic, and so forth. The FPGA can also include PCIe interfaces 946, analog-to-digital converters (ADC) 948, and the like.

In some FPGAs, each programmable tile can include at least one programmable interconnect element ("INT") 950 having connections to input and output terminals 952 of a programmable logic element within the same tile, as shown by examples included in FIG. 9. Each programmable interconnect element 950 can also include connections to interconnect segments 954 of adjacent programmable interconnect element(s) in the same tile or other tile(s). Each programmable interconnect element 950 can also include connections to interconnect segments 956 of general routing resources between logic blocks (not shown). The general routing resources can include routing channels between logic blocks (not shown) comprising tracks of interconnect segments (e.g., interconnect segments 956) and switch blocks (not shown) for connecting interconnect segments. The interconnect segments of the general routing resources (e.g., interconnect segments 956) can span one or more logic blocks. The programmable interconnect elements 950 taken together with the general routing resources implement a programmable interconnect structure ("programmable interconnect") for the illustrated FPGA.

In an example implementation, a CLB 930 can include a configurable logic element ("CLE") 960 that can be programmed to implement user logic plus a single programmable interconnect element ("INT") 950. A BRAM 932 can include a BRAM logic element ("BRL") 962 in addition to one or more programmable interconnect elements. Typically, the number of interconnect elements included in a tile depends on the height of the tile. In the pictured example, a BRAM tile has the same height as five CLBs, but other numbers (e.g., four) can also be used. A signal processing block 934 can include a DSP logic element ("DSPL") 964 in addition to an appropriate number of programmable interconnect elements. An IOB 936 can include, for example, two instances of an input/output logic element ("IOL") 966 in addition to one instance of the programmable interconnect element 950. As will be clear to those of skill in the art, the actual I/O pads connected, for example, to the input/output logic element 966 typically are not confined to the area of the input/output logic element 966.

In the pictured example, a horizontal area near the center of the die is used for configuration, clock, and other control logic. Vertical columns 968 extending from this horizontal area or column are used to distribute the clocks and configuration signals across the breadth of the FPGA.

Some FPGAs utilizing the architecture illustrated in FIG. 9 include additional logic blocks that disrupt the regular columnar structure making up a large part of the FPGA. The additional logic blocks can be programmable blocks and/or dedicated logic.

Note that FIG. 9 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 9 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A system comprising:
a programmable device configured to couple to a host, the host comprising a processor and a memory controller, wherein the host is configured to generate a plurality of read/write requests, wherein the programmable device is separate from the host, wherein the programmable device is configured to receive the plurality of read/write requests and addresses associated therewith from the memory controller of the host, and wherein the programmable device is further configured to interleave the plurality of read/write requests across multiple communication channels of the programmable device, wherein a subset of bits within each address is used to identify a communication channel of the programmable device from the multiple communication channels of the programmable device; and
a memory configured to receive the plurality of read/write requests and another subset of bits associated therewith from the programmable device, wherein the memory is separate from the programmable device, wherein the memory is configured to store contents associated with the addresses for write requests and wherein the memory is configured to return contents associated with the addresses for a read request to the programmable device,
wherein the programmable device is further configured to return the received contents to the host for processing.

2. The system of claim 1, wherein the programmable device is a field programmable gate array (FPGA) and wherein the host includes a double data rate (DDR) memory.

3. The system of claim 1, wherein the memory is selected from a group consisting of a high bandwidth memory (HBM) and a double data rate (DDR).

4. The system of claim 1, wherein the interleaving is based on selecting a same order bits of the subset of bits within each address of a read/write request of the plurality of read/write requests.

5. The system of claim 1, wherein the programmable device is further configured to remap the address associated with each read/write request of the plurality of read/write requests to a physical address in the memory using an offset.

6. The system of claim 1, wherein the interleaving uniformly distributes the plurality of read/write requests across the multiple communication channels, and wherein the identification of the communication channel from the multiple communication channels increases efficiency associated with memory accesses by eliminating data replication.

7. The system of claim 1, wherein the programmable device comprises a plurality of processing units, wherein data from the host is distributed across the plurality of processing units.

8. The system of claim 7, wherein the programmable device further comprises a switch configured to route data between the multiple communication channels and the plurality of processing units.

9. The system of claim 1 further comprising:
two input buffers wherein at a first instance in time one input buffer is being written to by the host while simultaneously another input buffer is being read from by the programmable device; and
two output buffers wherein at the first instance in time one output buffer is being read from by the host while simultaneously another output buffer is being written to by the programmable device.

10. The system of claim 9, wherein at a second instance in time the one input buffer is being read from by the programmable device while simultaneously the another input buffer is being written to by the host, and wherein at the second instance in time the one output buffer is written to by the programmable device while simultaneously the another output buffer is being read from by the host.

11. The system of claim 10 further comprising:
a first mux associated with the two input buffers; and
a second mux associated with the two output buffers, wherein the first and the second mux are configured to switch between reading and writing to respective buffers at the first instance in time and the second instance in time.

12. A method comprising:
receiving a read request or a write request from a host comprising a processor and a memory controller to fetch or to store content into or from a memory component, wherein the read request or the write request has an address associated therewith;
determining a communication channel from a plurality of communication channels of a programmable device that is coupled to the host for accessing the memory component, wherein the communication channel is determined based on a subset of bits within the address;
transmitting the address via the determined communication channel to fetch the content associated therewith for the read request;
transmitting the address and the content to be stored via the determined communication channel for the write request;

receiving the fetched content from the memory component through the determined communication channel for the read request; and transmitting the fetched content to the host for the read request, wherein the programmable device is separate from the host, and wherein the memory is separate from the programmable device.

13. The method of claim 12, wherein the memory component is selected from a group consisting of a high bandwidth memory (HBM) and a double data rate (DDR), and wherein the programmable device is a field programmable gate array (FPGA) that receives the read request from the host.

14. The method of claim 12, wherein the determining comprises selecting a same order bits of the subset of bits within each address of a read/write request of a plurality of read/write requests.

15. The method of claim 12, wherein the determining the communication channel uniformly distributes read and write requests from the host across the multiple communication channels, and wherein the method further comprises remapping the address associated with read/write requests to a physical address in memory by using an offset.

16. The method of claim 12 further comprising routing data between the multiple communication channels and a plurality of processing units.

17. The method of claim 12 further comprising:
at a first instance in time, reading from one input buffer while simultaneously the host is writing into another input buffer; and
at the first instance in time, writing into one output buffer while simultaneously the host is reading from another output buffer.

18. The method of claim 17 further comprising:
at a second instance in time, reading from the another input buffer while simultaneously the host is writing into the one input buffer; and
at the second instance in time, writing to the another output buffer while simultaneously the host is reading from the one output buffer.

19. The method of claim 18 further comprising:
switching between reading and writing to respective buffers at the first instance in time and the second instance in time.

20. The method of claim 12 further comprising distributing data received from the host across a plurality of processing units.

* * * * *